US011492020B2

(12) United States Patent
Mancuso et al.

(10) Patent No.: US 11,492,020 B2
(45) Date of Patent: Nov. 8, 2022

(54) METHOD OF INTELLIGENTLY MANAGING PRESSURE WITHIN AN EVACUATED TRANSPORTATION SYSTEM

(71) Applicant: Flowserve Management Company, Irving, TX (US)

(72) Inventors: Michael Albert Mancuso, Coppell, TX (US); Paul Matthew Hawkins, Dallas, TX (US)

(73) Assignee: Flowserve Management Company, Irving, TX (US)

( * ) Notice: Subject to any disclaimer, the term of this patent is extended or adjusted under 35 U.S.C. 154(b) by 441 days.

(21) Appl. No.: 16/867,049

(22) Filed: May 5, 2020

(65) Prior Publication Data
US 2021/0347391 A1    Nov. 11, 2021

(51) Int. Cl.
*B61B 13/12* (2006.01)
*B60V 3/04* (2006.01)
(Continued)

(52) U.S. Cl.
CPC ........... *B61B 13/122* (2013.01); *B60L 13/06* (2013.01); *B60V 3/04* (2013.01); *B61B 13/08* (2013.01); *B61B 13/10* (2013.01); *F16K 3/34* (2013.01)

(58) Field of Classification Search
CPC ....... B61B 13/122; B61B 13/08; B61B 13/10; B60V 3/04; B60L 13/06; F16K 3/30; F16K 3/34; Y02T 30/00
See application file for complete search history.

(56) References Cited

U.S. PATENT DOCUMENTS 2,973,894 A    3/1961  Kimball et al.
3,006,288 A   10/1961  Brown
(Continued)

FOREIGN PATENT DOCUMENTS

CN    109356647 A    2/2019
EP      1544473 A2   6/2005
(Continued)

OTHER PUBLICATIONS

Zhang et al, Y. Key Vacuum Technology Issues to be Solved in Evacuated Tube Transportation, IEEE, Journal of Modern Transportation, vol. 19, No. 2, pp. 110-113. (Year: 2011).*
(Continued)

*Primary Examiner* — Russell Frejd
(74) *Attorney, Agent, or Firm* — Maine Cernota & Rardin

(57) ABSTRACT

A high-speed transportation system comprises an evacuated travel conduit divided into a plurality of segments by closable gates, and associated with corresponding segment pumps that maintain operating vacuums within the segments when vehicles are present. When a segment is unoccupied, energy is saved by closing the adjoining gates and deactivating the associated segment pump, thereby deactivating the segment and allowing the segment's internal pressure to rise due to leakage. As a vehicle approaches, the segment pump is reactivated, lowering the internal pressure to the operating vacuum, and the gates are opened. Embodiments include a boom-tank system that can accelerate re-evacuation of a segment having an increased internal pressure by establishing fluid communication with at least one recently deactivated segment having a lower internal pressure. As a vehicle transits the conduit, a rolling, contiguous group of activated segments surrounding and in advance of the vehicle can be maintained.

15 Claims, 5 Drawing Sheets

(51) Int. Cl.
    *B61B 13/10*         (2006.01)
    *B61B 13/08*         (2006.01)
    *B60L 13/06*         (2006.01)
    *F16K 3/34*          (2006.01)

(56) References Cited

U.S. PATENT DOCUMENTS

| | | | | |
|---|---|---|---|---|
| 3,610,163 | A | * | 10/1971 | Edwards .............. B61B 13/122 251/44 |
| 3,820,740 | A | * | 6/1974 | Alexandrov ........... B65G 51/04 406/176 |
| 3,922,110 | A | | 11/1975 | Huse |
| 4,225,288 | A | | 9/1980 | Mugele et al. |
| 4,470,576 | A | | 9/1984 | Schertler |
| 4,505,647 | A | | 3/1985 | Alloca |
| 4,699,570 | A | | 10/1987 | Bohn |
| 4,850,809 | A | | 7/1989 | Smith |
| 5,595,477 | A | | 1/1997 | Amlinger |
| 5,944,049 | A | | 8/1999 | Beyer |
| 6,004,109 | A | | 12/1999 | Gebele |
| 6,589,023 | B2 | | 7/2003 | Royce |
| 7,021,888 | B2 | | 4/2006 | Jostlein |
| 7,814,922 | B2 | | 10/2010 | Tollner |
| 10,094,381 | B2 | | 10/2018 | Calhoun |
| 10,286,928 | B1 | | 5/2019 | Neophytou et al. |
| 2004/0079257 | A1 | | 4/2004 | Tidmarsh et al. |
| 2007/0295209 | A1 | | 12/2007 | Strauser |
| 2010/0116349 | A1 | | 5/2010 | Fischer |
| 2014/0261054 | A1 | * | 9/2014 | Oster ...................... E01B 25/30 104/130.02 |
| 2016/0229297 | A1 | | 8/2016 | Finodeyev et al. |
| 2016/0230899 | A1 | | 8/2016 | Cothern |
| 2017/0146136 | A1 | | 5/2017 | Cothern et al. |
| 2017/0350632 | A1 | | 12/2017 | Hirao |
| 2018/0281820 | A1 | * | 10/2018 | Grip ........................ B61B 13/08 |
| 2019/0211661 | A1 | | 7/2019 | Reckels |
| 2019/0344806 | A1 | | 11/2019 | Kalra et al. |
| 2020/0001897 | A1 | | 1/2020 | Neophytou et al. |
| 2020/0083676 | A1 | | 3/2020 | Rochin Machado |
| 2020/0109705 | A1 | | 4/2020 | Suzuki |
| 2020/0122748 | A1 | * | 4/2020 | Grip ........................ B60L 13/04 |

FOREIGN PATENT DOCUMENTS

| | | | |
|---|---|---|---|
| JP | 7172579 | A | 7/1995 |
| JP | 2009011182 | A | 1/2009 |
| JP | 2012180032 | A | 9/2012 |
| KR | 20110069392 | A | 6/2011 |
| KR | 101130807 | B1 | 3/2012 |
| KR | 101920414 | B1 | 11/2018 |
| WO | 2009061443 | A1 | 5/2009 |

OTHER PUBLICATIONS

International Search Report and Written Opinion for PCT Appl. No. PCT/US2021/015071, dated Apr. 28, 2021, 10 Pages.

International Preliminary Report on Patentability for Application No. PCT/US2019/060049 dated May 27, 2021, 10 pages.

Notice of Allowance for U.S. Appl. No. 16/675,854 dated Aug. 15, 2022, 16 pages.

Corrected Notice of Allowance for U.S. Appl. No. 16/675,854 dated Aug. 17, 2022, 13 pages.

International Preliminary Report on Patentability for PCT Appl. No. PCT/US2021/015071 dated Aug. 25, 2022, 7 pages.

International Search Report and Written Opinion for PCT Appl. No. PCT/US2020/031452, dated Jan. 29, 2021, 12 Pages.

Extended European Search Report for Application No. EP 19885343. 4, dated Dec. 14, 2021, 7 pages.

Office Action Restriction for U.S. Appl. No. 16/675,854 dated Feb. 22, 2022, 7 pages.

Office Action for U.S. Appl. No. 16/675,854 dated May 24, 2022, 44 pages.

Hartranft, John; 1991; "GE LM2500 Marine Gas Turbine Experience"; The American Society of Mechanical Engineers, pp. 1-6 (Year: 1991).

International Search Report and Written Opinion for International Application No. PCT/US2019/060049, dated Apr. 9, 2020, 12 Pages.

* cited by examiner

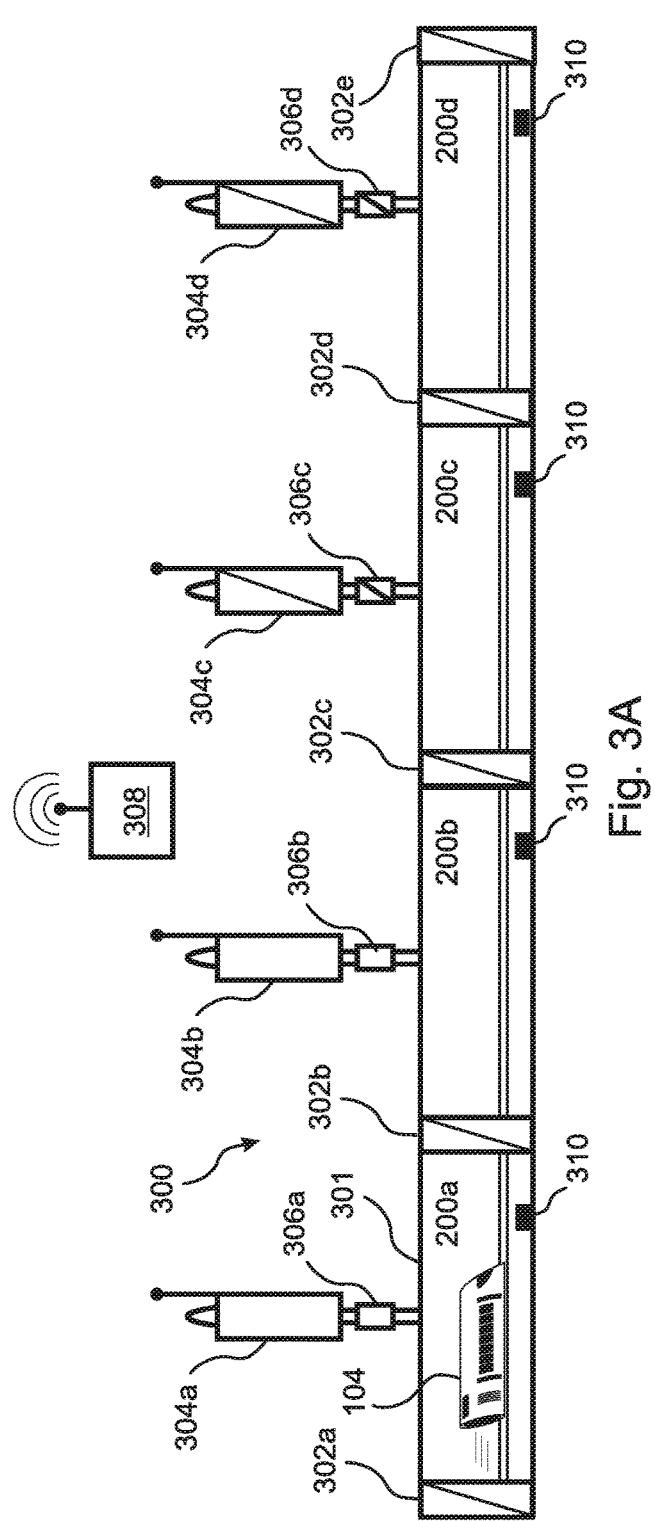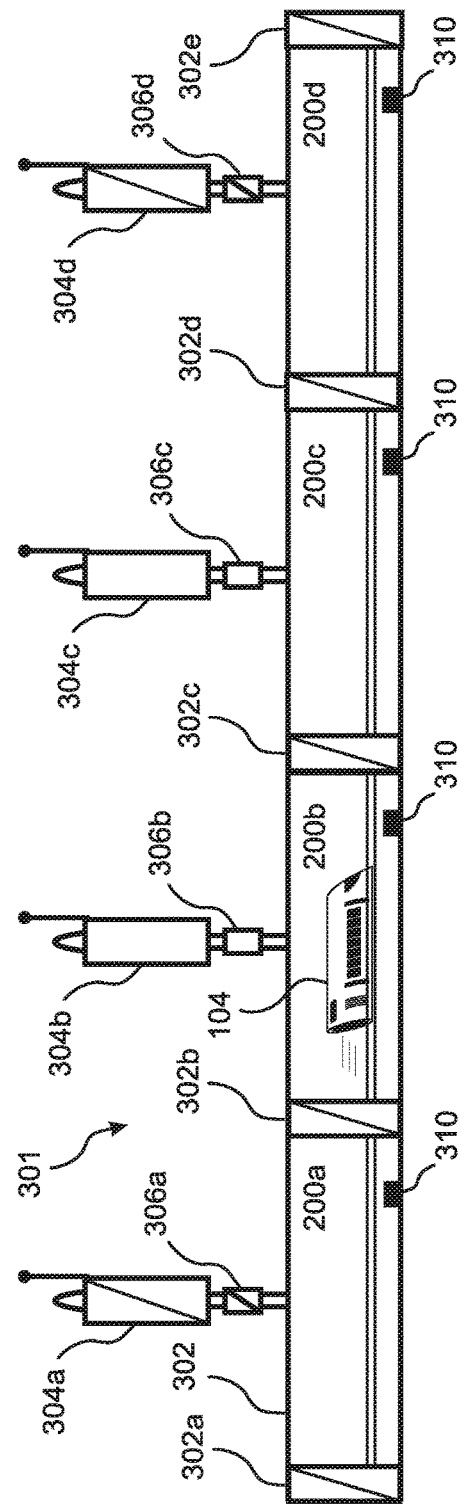
Fig. 3A
Fig. 3B

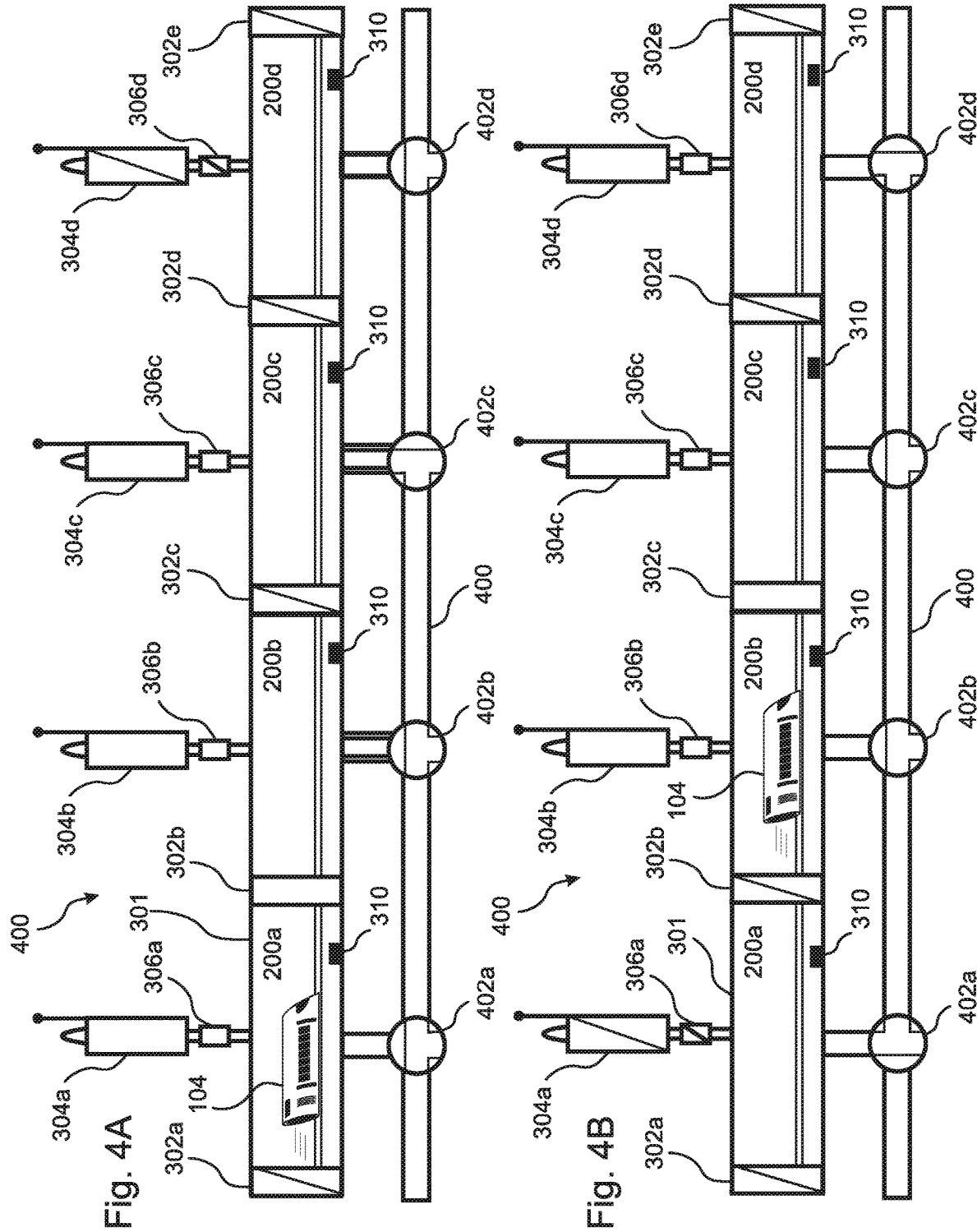

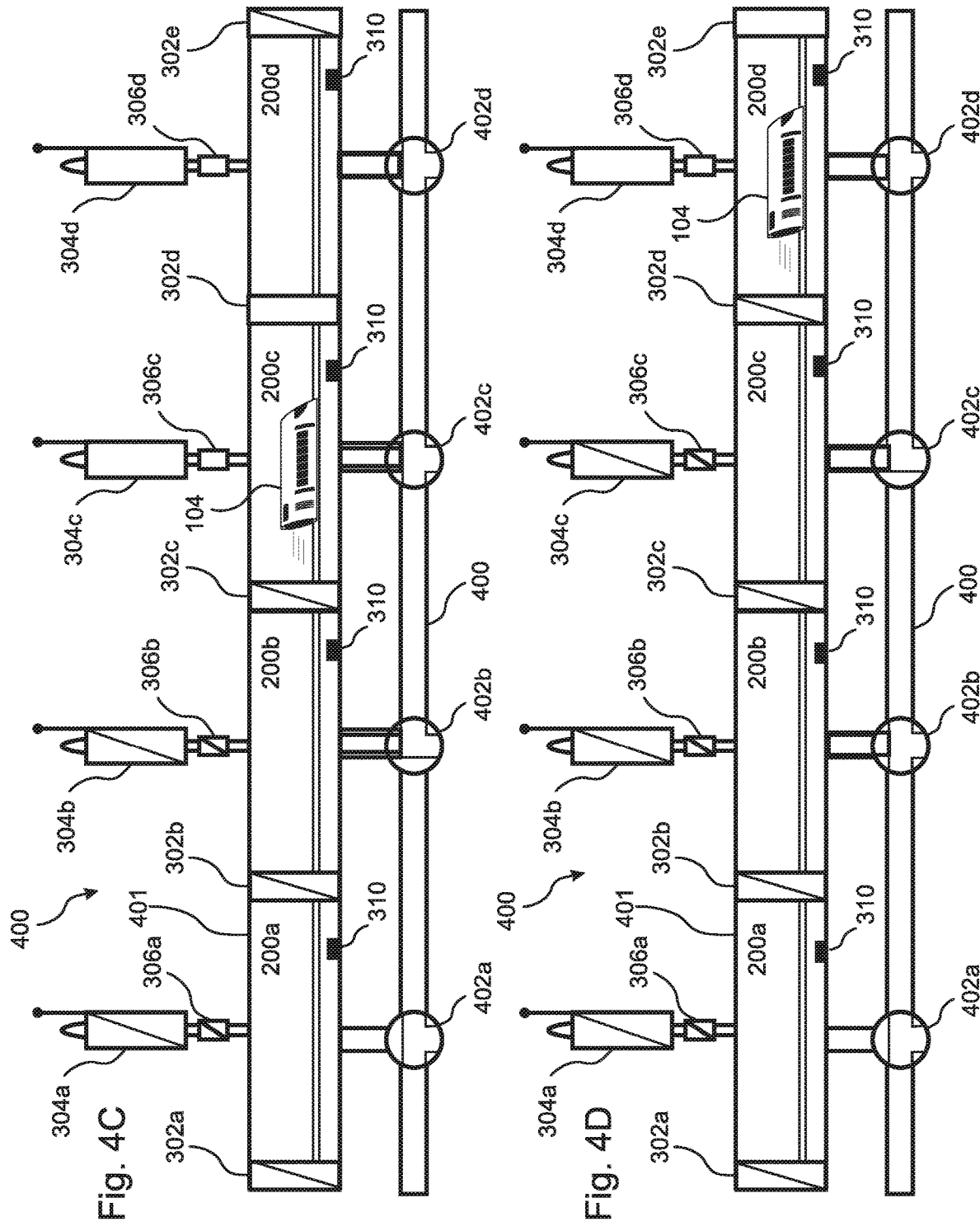

METHOD OF INTELLIGENTLY MANAGING PRESSURE WITHIN AN EVACUATED TRANSPORTATION SYSTEM

RELATED APPLICATIONS

This application is related to U.S. application Ser. No. 16/675,854, filed Nov. 6, 2019, which is herein incorporated by reference in its entirety for all purposes.

FIELD OF THE INVENTION

The invention relates to evacuated transportation systems, and more particularly, to apparatus and methods for maintaining vacuums within the travel conduits of evacuated transportation systems.

BACKGROUND OF THE INVENTION

The conventional methods of conveying people and cargo over large distances can be categorized into four basic types: rail, road, water, and air. Travel by air is fast, but expensive. Transportation by road, rail, and water tends to be less expensive than air travel, but is comparatively slow. Generally, there is a strong desire for improved methods of transportation that would provide travel at speeds approaching those of air transportation, but with reduced cost and energy consumption.

Very high-speed rail systems that can travel at speeds above 300 MPH are currently in use in several locations throughout the world. One pioneering example is the "Shinkansen" rail line in Japan. However, even the most modern high-speed rail systems do not approach the speeds of commercial air travel. Also, the costs and energy consumption of current very high-speed rail systems are considerable. A major factor that limits the economy and energy efficiency of high-speed rail systems is the air resistance that is encountered by a train as it travels at a high speed.

With reference to FIG. 1, several new approaches have been proposed that would address this problem by providing an evacuated transportation system 100 that conveys large numbers of people and/or other cargo in vehicles 104 that travel over long distances through specially prepared travel conduits or "tubes" 102 that have been partially or fully evacuated to significantly reduce or eliminate air resistance. According to some proposals, the vehicles 104 are supported or suspended on rails within the tube 102, while in other proposals the vehicles 104 are magnetically levitated. One proposal that appears to be highly promising is the so-called "hyperloop" approach.

In addition to reducing costs and shortening transportation times, the approach of transporting people and cargo through an evacuated travel conduit has the potential to reduce energy consumption and environmental impact, including carbon emissions, energy transmission and other environmental damage. In addition to reducing direct energy usage, the proposed vacuum transportation systems also have the potential to reduce secondary pollution such as pollution arising from requirements for transporting and distributing fossil fuels over large regions.

An evacuated travel conduit that extends over many miles will undoubtedly require periodic maintenance and repairs. For that reason, with reference to FIG. 2, the evacuated travel conduit 102 will need to be constructed as a series of interconnecting transportation tubes or "segments" 200a-d separated by closable barriers 202a-e that can isolate the segments 200a-d from each other, so that individual segments, e.g. 200a, can be vented to allow for repairs and maintenance, and then re-evacuated, while the remainder of the segments 200b-d remain evacuated. Although each segment 200a-d will represent only a fraction of the travel conduit as a whole, nevertheless, each segment 200 a-d will have a very large volume. For example, in a typical implementation each segment 200a-d could be five meters in diameter and between 10 and 20 miles in length.

The very large scale of these conduit segments 200a-d gives rise to special challenges that must be overcome so as to evacuate the segments 200a-d as rapidly and efficiently as possible upon initial installation and after repair or servicing of a conduit segment. Approaches to solving this problem are disclosed in related, co-pending U.S. application Ser. No. 16/675,854, also submitted by the present Applicant, which is incorporated herein by reference in its entirety for all purposes.

Another problem that is associated with evacuated transportation systems is that the evacuated conduit 102 will inevitably leak. As a result, it will be necessary to provide a dedicated evacuation system cooperative with the travel conduit 102 that will be periodically or continuously operated even during normal operation, so as to compensate for the slow but inevitable seepage of air into the travel conduit 102. Typically, the evacuation system will include pumps 204 and associated valves 206a-d cooperative with the segments 200a-d of the travel conduit 102. The resulting energy cost and environmental impact of maintaining a required degree of vacuum within the travel conduit 102 of an evacuated transportation system could be considerable.

Of course, the cost efficiency of an evacuated transportation system can be improved by using it as much as possible. However, experience with existing transportation systems has demonstrated that all transportation systems have "peak" times of usage, interspersed with periods of lower utilization. Accordingly, it is likely that any evacuated transportation system will be required to incur high costs and energy consumption so as to maintain the vacuum within the travel conduit even during time periods when relatively few vehicles are being transported through the system.

What is needed, therefore, is a method of reducing the energy consumption and cost of maintaining a vacuum within a travel conduit of an evacuated transportation system, especially during off-peak times when usage of the transportation system is reduced.

SUMMARY OF THE INVENTION

The present invention is an apparatus and method that reduces the energy consumption and cost of maintaining a vacuum within a travel conduit of an evacuated transportation system, especially during off-peak times when usage of the transportation system is reduced.

According to the present invention, the vacuum transportation system includes a travel conduit through which vehicles travel within an operating vacuum that is less than or equal to a maximum operating pressure. The travel conduit is divided by closable barriers into a plurality of conduit segments that can be interconnected or isolated from each other by the barriers as needed. Associated with each of the conduit segments is a segment evacuation system that is operable to compensate for leakage of air into the conduit segment. For ease of expression, the segment evacuation systems are sometimes referred to herein as "segment pumps," although they can include any combination of evacuating apparatus, which may or may not include pumps.

The segment pumps can be operable only for reestablishing and maintaining the vacuum of the conduit segments during system operation, or they can also participate in re-evacuating the conduit segments after venting, for example after a repair has been performed.

All of the barriers and segment pumps are in wired or wireless communication with a controller that can open and close the barriers, activate and deactivate the segment pumps, and open and close connecting valves associated with the segment pumps, so as to "activate" and "deactivate" conduit segments. As used herein, "deactivating" a conduit segment refers to disengaging the associated segment pump by closing the valve that connects the segment pump to the conduit segment, and deactivating the segment pump. The pressure within a deactivated conduit segment is thereby allowed to rise due to unavoidable leakage of air into the conduit segment. Typically, a conduit segment would not be deactivated if it were not "idle," i.e. unoccupied by any vehicles, or about to become idle. In some embodiments, the pressure within a deactivated conduit segment is allowed to rise until the conduit segment is reactivated. In other embodiments, a maximum idle pressure is specified, and the segment pump is operated as needed to ensure that the internal pressure of the deactivated conduit segment does not rise above the maximum idle pressure.

"Activating" or "reactivating" a conduit segment, as used herein, refers to activating the associated segment pump and engaging the segment pump by opening the valve connecting the segment pump to the conduit segment. Once a conduit segment has been activated, the internal pressure within the conduit segment is lowered to (or below) the operating pressure, so that at least one barrier adjacent to the reactivated conduit segment can be opened to allow entry of a vehicle into the conduit segment. Typically, at least one of the barriers that is adjacent to the deactivated conduit segment is closed, especially if an adjacent conduit segment remains active. Depending on the embodiment, the controller may or may not close barriers that are between adjacent activated conduit segments or between adjacent deactivated conduit segments.

The present invention reduces the energy consumption of the evacuated transportation system by deactivating conduit segments whenever they are idle and no vehicle is approaching, thereby reducing the energy that is consumed by the associated segment pumps.

When the controller detects that a vehicle is approaching a deactivated conduit segment, the controller "activates" the conduit segment by reengaging and reactivating the segment pump for that conduit segment in sufficient time to allow the pressure within the reactivated conduit segment to fall below the maximum operating pressure before the vehicle arrives. The conduit segment is subsequently deactivated when the vehicle has passed through it, unless there are additional vehicles within or approaching the conduit segment.

In embodiments, the controller determines a length of time $t_e$ that is needed to reduce the elevated internal pressure of a deactivated conduit segment down to the maximum operating pressure, and reactivates the conduit segment when $t_e$ is equal to an estimated arrival time of a nearest approaching vehicle. The internal pressure of the reactivated conduit segment is thereby reduced to a pressure at or below the maximum operating pressure "just in time" for the arrival of the vehicle.

In some embodiments where all of the vehicles travel at a defined speed $v_s$, and where deactivated conduit segments are maintained at a maximum idle pressure, so that $t_e$ is fixed, conduit segments are automatically activated when an approaching vehicle reaches a critical distance from the conduit segment that is equal to $t_e*v_s$. In some of these embodiments, vehicle sensors are placed within the conduit segments at locations that are offset from neighboring conduit segments by this critical distance, so that deactivated conduit segments can be automatically reactivated whenever a vehicle reaches a sensor that is offset by the critical distance in a neighboring conduit segment.

Depending on the rates of residual leakage, the volumes of the conduit segments, and the pumping rates of the segment pumps, in some embodiments the controller is configured to activate an idle conduit segment when an approaching vehicle reaches a specified location within an adjacent conduit segment. In other embodiments, idle conduit segments are activated by the controller before an approaching vehicle reaches the adjacent conduit segment, such that a "rolling group" of conduit segments are activated as the vehicle moves through the travel conduit. For example, in some embodiments, as a vehicle moves through the travel conduit a three-segment rolling group of activated conduit segments is maintained, whereby at any given time at least the conduit segment in which the vehicle is currently located and the two adjacent conduit segments that the vehicle is approaching are activated, while the other segments of the travel conduit are deactivated unless the presence of other vehicles requires their activation. In similar embodiments, rolling groups of four or more conduit segments are maintained for each vehicle that passes through the travel conduit.

In embodiments, the disclosed evacuated transportation system further includes a boom-tank system comprising a network of passages and valves that interconnect the conduit segments. According to these embodiments, when a first conduit segment is deactivated after a vehicle has passes through it, the controller configures the boom-tank system such that the newly deactivated first conduit segment, for which the internal pressure hast not yet risen above the maximum operating pressure, is connected through the boom-tank system to a second conduit segment that has recently been activated, and which has an internal pressure that is higher than the internal pressure of the first conduit segment due to leakage during deactivation. This interconnection of the first and second conduit segments via the boom-tank system allows the first conduit segment to act as a "boom-tank" for the second conduit segment, essentially jump-starting the process of reducing the pressure in the newly activated second conduit segment, and reducing the time required to lower the pressure within the second conduit segment below the maximum operating pressure.

In embodiments, the controller is able to react to more complex, multi-vehicle conditions by using the boom-tank system to interconnect conduit segments whenever it is possible to reduce the activation time of a recently activated conduit segment by taking advantage of the remaining vacuum within a recently deactivated conduit segment.

A first general aspect of the present invention is an evacuated transportation system that includes a travel conduit configured, when in operation, to enable transit therethrough of vehicles. The travel conduit is separated into a sequential plurality of conduit segments by intervening closable gates, said conduit segments being characterized as occupied whenever at least one of the vehicles is transiting therethrough, and being characterized as unoccupied when none of the vehicles is transiting therethrough.

The evacuated transportation system further includes a plurality of segment evacuation systems, each of which is associated with a corresponding one of the conduit segments. Each of the segment evacuation systems is configured, when activated, to establish and maintain an internal pressure of its corresponding conduit segment that is at or below a maximum operating pressure, and each of the segment evacuation systems is configured, when deactivated, to disengage from its corresponding conduit segment and to minimize its consumption of energy.

The evacuated transportation system further includes a controller that is able to activate and deactivate the segment evacuation systems, and to cause the gates to open and close, the controller being configured to conserve energy while the travel conduit is in operation by deactivating at least one of the segment evacuation systems when its corresponding conduit segment is unoccupied, while ensuring that each of the conduit segments, whenever it is occupied, is evacuated to an internal pressure that is at or below the maximum operating pressure.

Embodiments further include sensors cooperative with the travel conduit, the sensors being configured to provide information to the controller relating to at least one of locations, speeds, and directions of travel of the vehicles within the travel conduit.

In any of the above embodiments, each of the segment evacuation systems can include a segment evacuation valve that is configured to enable fluid communication between the segment evacuation system and its associated conduit segment when the segment evacuation system is activated, and to isolate the segment evacuation system from fluid communication with its associated conduit segment when the segment evacuation system is deactivated.

In any of the above embodiments, at least one of the segment evacuation systems can be configured to participate in reestablishing a vacuum within its corresponding conduit segment after a pressure within the conduit segment has been raised to atmospheric pressure.

In any of the above embodiments, the controller can be configured to activate all of the segment evacuation systems having associated conduit segments for which there is an approaching vehicle in an adjacent conduit segment.

In any of the above embodiments, the controller can be configured to activate all of the segment evacuation systems having associated conduit segments for which an approaching vehicle is separated from the conduit segment by only one intervening conduit segment.

Any of the above embodiments can further include a boom-tank system comprising a plurality of boom-tank passages in fluid communication with the conduit segments and interconnected with each other via a plurality of boom-tank valves, the controller being able to cause the boom tank valves to enable and disable fluid communication between selected pairs of conduit segments. In some of these embodiments, the controller is configured to reduce an internal pressure within a first of the conduit segments by causing the boom-tank valves to establish fluid communication between the first of the conduit segments and a second of the conduit segments if an internal pressure of the second conduit segment is lower than the internal pressure of the first conduit segment. And in any of these embodiments, the controller can be able to cause the boom-tank valves to establish simultaneous fluid communication between at least three of the conduit segments.

A second general aspect of the present invention is a method of reducing energy consumption of an evacuated transportation system comprising a travel conduit configured, when in operation, to enable transit therethrough of vehicles, the travel conduit being divided into a sequential plurality of conduit segments by intervening closable gates; the transportation system further comprising a plurality of segment evacuation systems, each of the segment evacuation systems being associated with a corresponding one of the conduit segments. The method includes periodically or continuously performing the following steps:

A) for each of the vehicles that is within the travel conduit, determining the vehicle's location, speed, and direction of travel;
B) for each of the conduit segments that is occupied, in that it contains at least one of the vehicles, causing the associated segment evacuation system to maintain an internal pressure of the conduit segment at or below a specified maximum operating pressure;
C) for each of the conduit segments that is unoccupied, in that it does not contain one of the vehicles determining a time duration $t_u$ during which the conduit segment will remain unoccupied and a length of time $t_e$ required for the associated segment evacuation system to reduce the internal pressure of the conduit segment until said internal pressure is at or below the specified maximum operating pressure, and
D) if $t_u$ is greater than $t_e$, deactivating the associated segment evacuation system; or
E) if $t_u$ is less than or equal to $t_e$, activating the associated segment evacuation system.

Embodiments further include closing all of the gates that are between a conduit segment having an internal pressure at or below the maximum operating pressure and a conduit segments having an internal pressure above the maximum operating pressure.

In any of the above embodiments, deactivating a segment evacuation system can include isolating the segment evacuation system from fluid communication with its associated conduit segment by closing an evacuation valve of the segment evacuation system, and activating the segment evacuation system can include establishing fluid communication between the segment evacuation system and its associated conduit segment by opening the evacuation valve of the segment evacuation system.

In any of the above embodiments, the method can further include activating one of the segment evacuation systems while reestablishing a vacuum within its corresponding conduit segment after an internal pressure of the conduit segment has been raised to atmospheric pressure.

In any of the above embodiments, the evacuated transportation system can further comprises a boom-tank system that includes a plurality of boom-tank passages in fluid communication with the conduit segments and interconnected with each other via a plurality of boom-tank valves, and the method can further include identifying a first of the conduit segments having an internal pressure p1 that is above the maximum operating pressure, identifying a second of the conduit segments having an internal pressure less than p1, and causing the boom-tank system to establish fluid communication between the first and second conduit segments. Some of these embodiments further include identifying a plurality of second conduit segments having internal pressures that are less than p1 and causing the boom-tank system to establish fluid communication between the first conduit segment and the plurality of second conduit segments.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 3A illustrates an embodiment of the present invention wherein a vehicle is within a first conduit segment while a second conduit segment is activated and third and fourth conduit segments are deactivated;

FIG. 3B illustrates the embodiment of FIG. 3A wherein the vehicle is within the second conduit segment while the third conduit segment is activated and the first and fourth conduit segments are deactivated;

FIG. 4A illustrates an embodiment of the present invention that includes a boom-tank system, wherein the vehicle is within a first conduit segment while second and third conduit segments are activated and a fourth conduit segment is deactivated;

FIG. 4B illustrates the embodiment of FIG. 4A, wherein the vehicle is within the second conduit segment while the third and fourth conduit segments are activated and the first conduit segment is deactivated;

FIG. 4C illustrates the embodiment of FIG. 4B, wherein the vehicle is within the third conduit segment while the fourth conduit segment is activated and the first and second conduit segments are deactivated;

FIG. 4D illustrates the embodiment of FIG. 4C, wherein the vehicle is within the fourth conduit segment while the first, second, and third conduit segments are deactivated.

DETAILED DESCRIPTION

Figure 1:
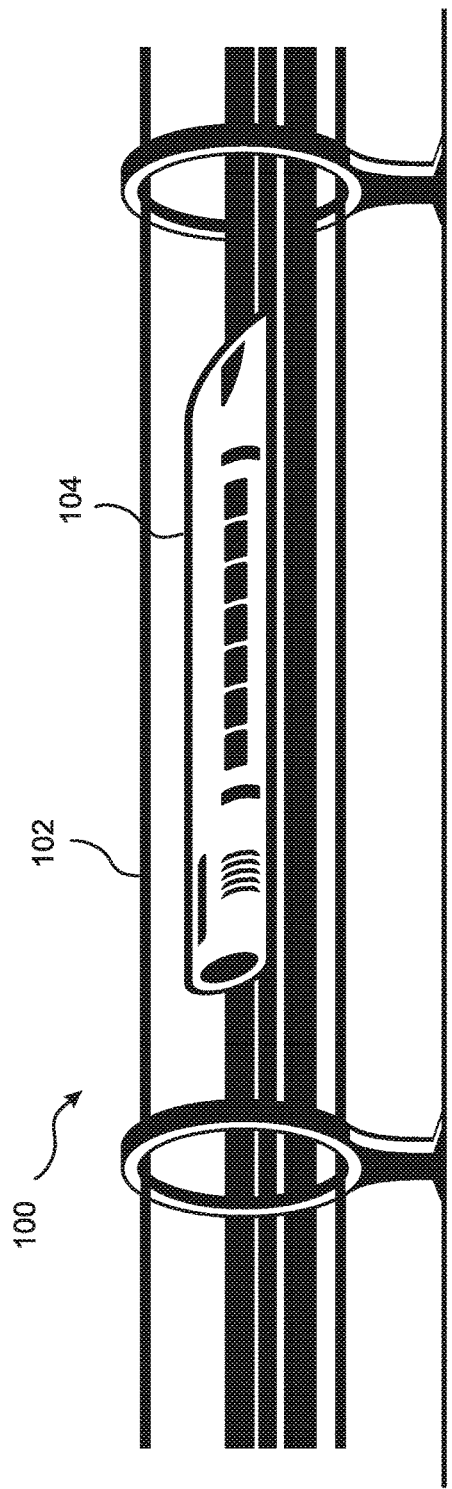
FIG. 1 illustrates a conduit and vehicle of an evacuated transportation system of the prior art.
Figure 2:
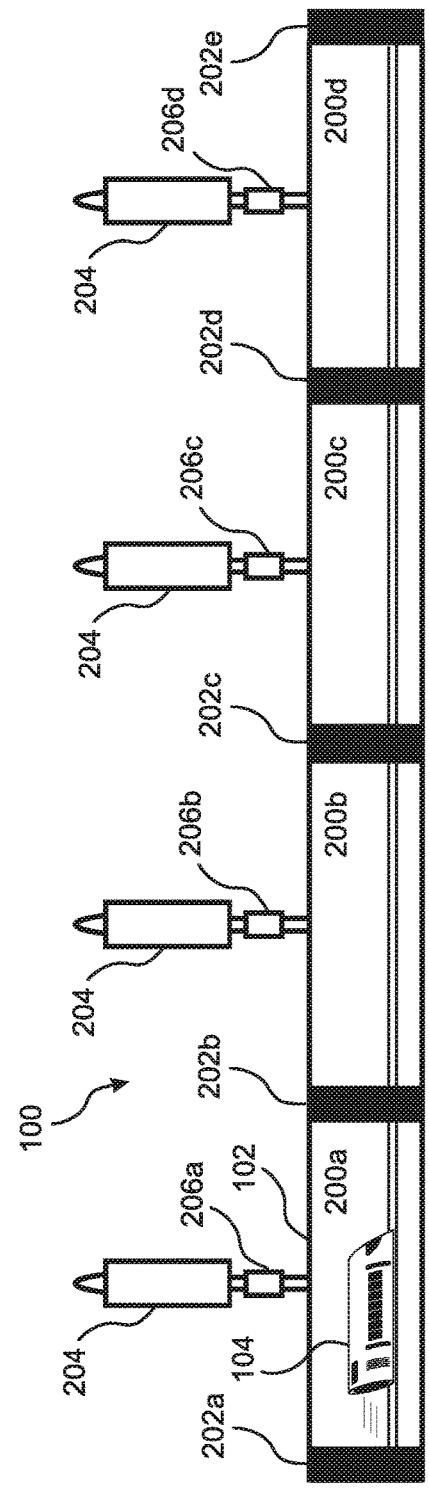
FIG. 2 illustrates a vehicle transiting an evacuated travel conduit of a multi-segment evacuated transportation system of the prior art.

The present invention is an apparatus and method of reducing the energy consumption and cost of maintaining a vacuum within a travel conduit of an evacuated transportation system, especially during off-peak times when usage of the transportation system is reduced.

With reference to FIG. 3A, the vacuum transportation system 300 includes a travel conduit 301 through which vehicles 104 travel within an operating vacuum that is less than or equal to a maximum operating pressure. The travel conduit 301 is divided by closable barriers 302$a$-$e$ into a plurality of conduit segments 200$a$-$d$ that can be interconnected or isolated from each other by the barriers 302$a$-$e$ as needed. Associated with each of the conduit segments 200$a$-$d$ is a segment evacuation system 302$a$-$d$ that is operable to compensate for leakage of air into the conduit segment 200$a$-$d$. For ease of expression, the segment evacuation systems 304$a$-$d$ are sometimes referred to herein as "segment pumps" 304$a$-$d$, although the segment evacuation system can include any combination of evacuating apparatus, and may not include a pump. The segment pumps 304$a$-$d$ can be operable only for establishing and maintaining the vacuum of the conduit segments 200$a$-$d$ during system operation, or they can also participate in re-evacuating the conduit segments 200$a$-$d$ after venting, for example after a repair has been performed.

All of the barriers 302$a$-$e$ and segment pumps 304$a$-$d$ are in wired or wireless communication with a controller 308 that can open and close the barriers 302$a$-$e$, activate and deactivate the segment pumps 304$a$-$d$, and open and close connecting valves 306$a$-$d$ associated with the segment pumps 304$a$-$d$, so as to "activate" and "deactivate" conduit segments 200$a$-$d$.

As used herein, "deactivating" a conduit segment 200$a$-$d$ refers to disengaging the associated segment pump 304$a$-$d$ by closing the valve 306$a$-$d$ that connects the segment pump 304$a$-$d$ to the conduit segment 200$a$-$d$, and deactivating the segment pump 304$a$-$d$. When a conduit segment 200$a$-$d$ is deactivated by the controller 308, the internal pressure of that conduit segment 200$a$-$d$ will slowly rise due to residual leakage. In some embodiments, the internal pressure is allowed to rise until it becomes necessary to reactivate the conduit segment 200$a$-$d$ to prepare for the arrival of a vehicle 104. In other embodiments, the segment pump 304$a$-$d$ of a deactivated conduit segment 200$a$-$d$ is reactivated as needed to endure that the internal pressure does not exceed a specified maximum idle pressure.

Typically, at least one of the barriers 302$a$-$e$ that is adjacent to a deactivated conduit segment 200$a$-$d$ is closed, especially if an adjacent conduit segment 200$a$-$d$ remains active. Depending on the embodiment, the controller 308 may or may not close barriers 302$a$-$e$ that are between adjacent activated conduit segments 200$a$-$d$ or between adjacent deactivated conduit segments 200$a$-$d$.

As used herein, "activating" or "reactivating" a conduit segment 200$a$-$d$ refers to activating the associated segment pump 304$a$-$d$ and engaging the segment pump by opening the valve 306$a$-$d$ connecting the segment pump 304$a$-$d$ to the conduit segment 200$a$-$d$. This results in reducing the pressure within the conduit segment 200$a$-$d$ to the operating pressure, followed in most cases by opening at least one barrier 302$a$-$e$ adjacent to the conduit segment 200$a$-$d$.

The present invention reduces the energy consumption of the evacuated transportation system 300 by deactivating segment pumps 304$a$-$d$ when they are "idle," i.e. unoccupied, or about to become idle, and when no vehicle 104 is approaching. When a conduit segment 200$a$-$d$ is occupied, i.e. a vehicle 104 is traveling through the conduit segment 200$a$-$d$, and/or when a vehicle 104 is approaching the conduit segment 200$a$-$d$, the associated segment pump 304$a$-$d$ is operated as needed so as to establish and maintain an internal pressure of the conduit segment 200$a$-$d$ at or below the maximum operating pressure. Once the vehicle 104 has passed through the conduit segment 200$a$-$d$, such that the conduit segment 200$a$-$d$ is unoccupied and there are no other vehicles 104 approaching, the conduit segment 200$a$-$d$ is deactivated.

In embodiments, the controller 308 determines the locations, speeds, and travel directions of all vehicles 104 within the travel conduit 301. In some embodiments, sensors 310 are included within the conduit segments 200$a$-$d$ that provide information to the controller 308 regarding the locations, speeds, and/or directions of the vehicles 104. For each of the conduit segments 200$a$-$d$ that is unoccupied, the controller 308 then determines if a time interval $t_u$ during which the conduit segment 200$a$-$d$ will remain unoccupied is greater than a time period $t_e$ that will be required to reduce the internal pressure of the conduit segment 200$a$-$d$ to the maximum operating pressure. The controller 308 proceeds to deactivate the conduit segment 200$a$-$d$ if $t_u$ is greater than $t_e$, and waits until $t_u$ is equal to (or nearly equal to) $t_e$ before reactivating the conduit segment 200$a$-$d$. In this way, the internal pressure of a reactivated conduit segment 200$a$-$d$ is returned to a pressure that is at or below the maximum operating pressure "just in time" for the arrival of the approaching vehicle 104.

In some embodiments where all of the vehicles 104 travel at a defined speed $v_s$, and where deactivated conduit segments 200a-d are maintained at a maximum idle pressure, so that $t_e$ is fixed, conduit segments 200a-s are automatically activated when an approaching vehicle 104 reaches a critical distance from the conduit segment that is equal to $t_e*v_s$. In some of these embodiments, the vehicle sensors 310 are placed within the conduit segments at locations that are offset from neighboring conduit segments 200a-d by this critical distance, so that deactivated conduit segments 200a-d can be automatically reactivated whenever a vehicle 104 reaches a sensor 310 that is offset by the critical distance in a neighboring conduit segment 200a-d.

The controller 308 closes all barriers 302a-e that are between an activated conduit segment 200a-d and a deactivated conduit segment 200a-d. Depending on the embodiment, the controller 308 may or may not close barriers 302a-e that are between adjacent activated conduit segments 200a-d or between adjacent deactivated conduit segments 200a-d.

With continuing reference to FIG. 3A, when the controller 308 detects that a vehicle 104 is approaching a deactivated conduit segment 200b (FIG. 3A), the controller 308 "activates" the conduit segment 200b by reactivating the associated segment pump 304b, and opening the valve 306b that connects the associated segment pump 304b to the conduit segment 200b, all in sufficient time to allow the pressure within the conduit segment 200b to fall below the maximum operating pressure before the vehicle 104 arrives. The controller then opens the barrier 306b that is between the newly activated conduit segment 200b and the adjacent, already activated conduit segment 200a.

With reference to FIG. 3B, when the vehicle 104 has passed from the previously activated conduit segment 200a and entered the newly activated conduit segment 200b, the previously activated conduit segment 200a is deactivated because no other vehicles are within or approaching it. This includes closing the barrier 302b between the previously activated conduit segment 200a and the newly activated conduit segment 200b, closing the associated valve 306a, and deactivating the associated segment pump 304a. This process is continued as the vehicle 104 moves through the travel conduit 301.

In FIGS. 3A and 3B all of the gates 302a-d are shown as closed. However, it will be understood that during a time between FIGS. 3A and 3B the gate 302b between the first two conduit segments 200a, 200b is opened in time for the vehicle 104 to pass through, and is then closed again.

In the embodiment of FIGS. 3A and 3B, the controller 308 is configured to activate an idle conduit segment 200b when an approaching vehicle 104 reaches a specified location within an adjacent conduit segment 200a. Depending on the rates of residual air leakage into the conduit segments 200-d, the volumes of the conduit segments 200a-d, the pumping rates of the segment pumps 304, and the speeds at which the vehicles travel, in some embodiments the time that is required to complete activation of a conduit segment exceeds the time required for a vehicle to transit through a conduit segment.

Accordingly, in some embodiments the activation of idle conduit segments 200a-d is initiated by the controller 308 before an approaching vehicle 104 reaches the adjacent conduit segment 200a-d, such that the segment pumps of a "rolling group" of conduit segments 200a-d are activated as the vehicle 104 moves through the travel conduit 301. For example, in the embodiment of FIGS. 4A-4D, as a vehicle 104 moves through a travel conduit 301 a three-segment rolling group of activated conduit segments 200a-d is maintained, whereby at any given time at least the conduit pump 304a-d of the conduit segment 200a-d in which the vehicle 104 is currently located and the conduit pumps 304a-d of the next two conduit segments 200a-d that the vehicle 104 is approaching are activated, while the other segments of the travel conduit are deactivated unless the presence of other vehicle 104s requires their activation.

The embodiment 400 of FIGS. 4A-4D further includes a boom-tank system comprising a network of passages 400 and valves 402a-d that are used by the controller 308 to interconnect the conduit segments 200a-d so that recently deactivated conduit segments can act as "boom-tanks" that accelerate the process of reestablishing the vacuum within newly activated conduit segments 200a-d.

In FIG. 4A, the vehicle 104 is passing through a first conduit segment 200a, while the associated segment pump valve 306a remains open and the associated segment pump 304a remains in operation to maintain the vacuum within the conduit segment 200a. The next conduit segment 200b in the series has been activated and has nearly reached the operating vacuum. Accordingly, the barrier 302b between the first 200a and second 200b conduit segments has been opened in anticipation of the arrival of the vehicle 104. Meanwhile, the third conduit segment 200c has just been activated, i.e. the associated segment pump 304c has been activated and the associated segment pump valve 306c has been opened, while the fourth conduit segment 200d remains idle. In FIG. 4A, the first 200a, second 200b, and third 200c conduit segments thereby represent the segment rolling group of the embodiment at the moment that is illustrated in FIG. 4A.

In FIG. 4A, the boom tank system 400 is being used to accelerate the reduction of pressure within the third conduit segment 200c, as is explained in more detail with reference to FIG. 4B below.

In FIG. 4B, the vehicle 104 has moved into the second conduit segment 200b. The barrier 302b that terminates the first conduit segment 200a has been closed, and the first conduit segment 200a has been deactivated by closing the associated segment pump valve 306a and deactivating the associated conduit pump 304a. The third conduit segment 200c has achieved the operating vacuum, and the barrier 302c between the second 200b and third 200c conduit segments has been opened, and activation of the fourth conduit segment 200d has begun by opening the associated segment pump valve 306d and activating the associated conduit pump 304d. Accordingly, in FIG. 4B, the second 200b, third 200c, and fourth 200d conduit segments represent the three-segment rolling group of the embodiment, while the first conduit segment 200a is idle.

Because the pressure within the recently activated fourth conduit segment 200d is still relatively high, while the pressure within the recently deactivated first conduit segment 200a remains near the operating pressure, in FIG. 4B the controller has used the first 402a and third 402c valves of the boom tank system to create a fluid connection between the recently activated fourth conduit segment 200d and the recently deactivated first conduit segment 200a, thereby causing the pressures within the first 200a and fourth 200d conduit segments to be equalized. Accordingly, in FIG. 4B the interconnection of the first 200a and fourth 200d conduit segments 200a-d via the boom-tank system 400 essentially jump-starts the process of reducing the pressure in the newly activated fourth conduit segment 200d by causing the first conduit segment 200a to act as a "boom-tank."

In FIG. 4C, the process continues as described above with reference to FIGS. 4A and 4B. In FIG. 4C, the vehicle 104 has entered the third conduit segment 200c, while the second conduit segment 200b has been deactivated. As a result, the first 200a and second 200b conduit segments are both idle. While it has been recently deactivated, the second conduit segment 200b remains near the operating vacuum, and has been connected via the boom-tank system 400 to a fifth conduit segment (not shown) that has been recently activated.

Meanwhile, the controller has isolated the fourth conduit segment 200d from the boom tank system 400, and the pressure within the fourth conduit segment 200d has been further reduced by the associated segment pump 304d until it has reached the maximum operating pressure. Accordingly, the barrier 302d between the third 200c and fourth 200d conduit segments has been opened. In FIG. 4C, the third 200c, fourth 200d, and fifth (not shown) conduit segments represent the three-segment rolling group of the embodiment.

The process as described above with reference to FIGS. 4A-4C is continued in FIG. 4D. In similar embodiments, rolling groups of four or more conduit segments 200a-d are maintained for each vehicle 104 that passes through the travel conduit.

Figure 5:
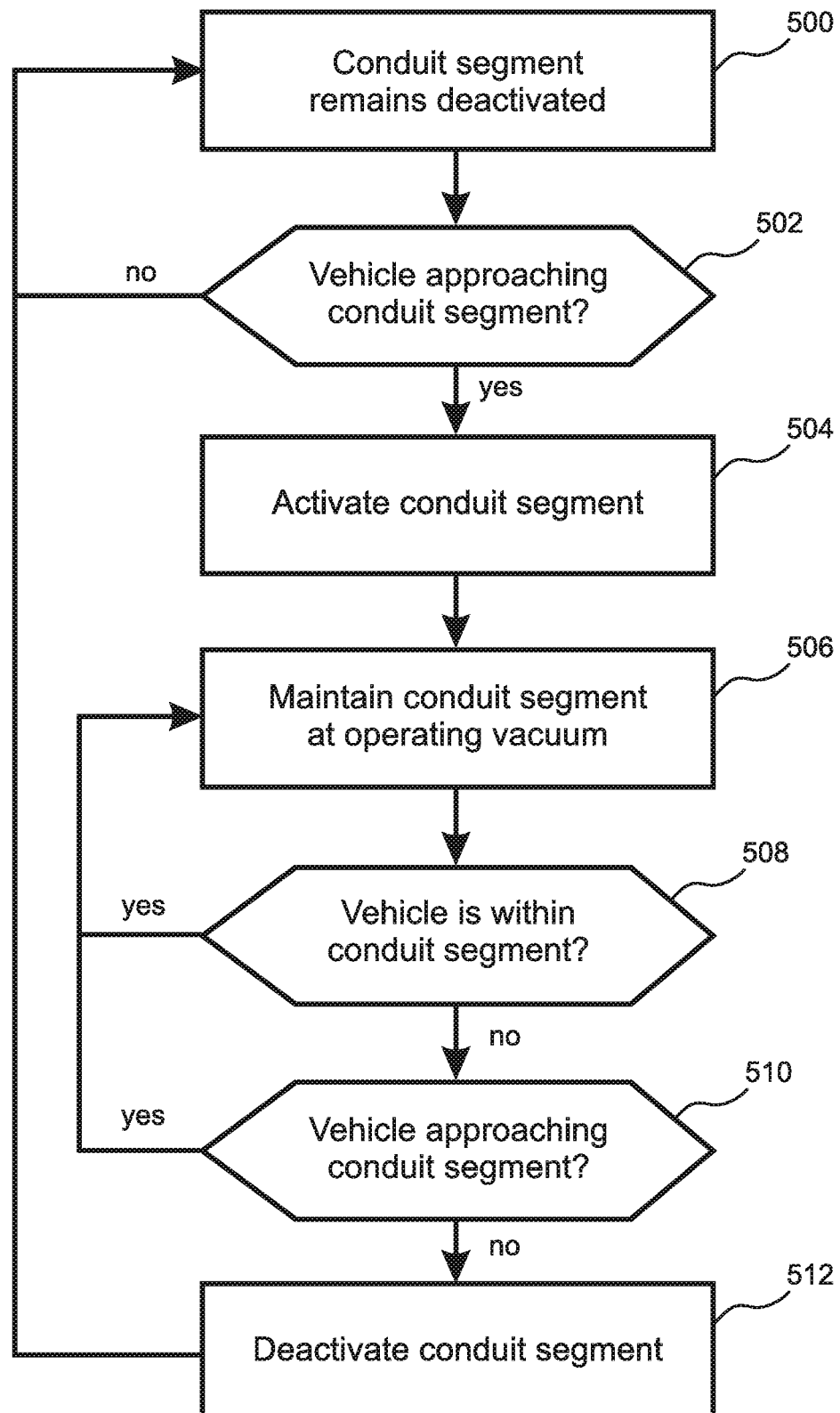
FIG. 5 is a flow diagram that illustrates a method embodiment of the present invention.

FIG. 5 is a flow diagram that illustrates the management of an individual conduit segment by the controller according to a method embodiment of the present invention during the transit of a single vehicle through the travel conduit. When no vehicle is present or approaching the conduit segment, the conduit segment remains deactivated 500 and is idle, while the controller monitors nearby conduit segments to detect when a vehicle is approaching 502. When an approaching vehicle is detected, the conduit segment is activated 504 by opening the associated evacuation system valve 306a-d and activating the associated segment pump 304a-d. In embodiments, a boom-tank system is used to accelerate the evacuation of the conduit segment by connecting it to a recently deactivated conduit segment, as discussed above with reference to FIGS. 4A-4D. The pressure within the conduit segment is then reduced until it is below the maximum operating pressure, after which the vehicle enters and traverses the conduit segment.

The conduit segment is maintained at the operating vacuum 506 while the vehicle transits through the conduit segment 508. Once the vehicle exits the conduit segment, the controller checks to determine if any other vehicles are approaching 510. If not, then the conduit segment is deactivated 512.

In embodiments, the controller 308 is able to react to more complex, multi-vehicle conditions by using the boom-tank system 400 to interconnect any selected group of conduit segments 200a-d whenever it is possible to reduce the activation time of a recently activated conduit segment 200a-d by taking advantage of the remaining vacuum within one or more recently deactivated conduit segments 200a-d.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. An evacuated transportation system, comprising:
   a travel conduit configured, when in operation, to enable transit therethrough of vehicles, the travel conduit being separated into a sequential plurality of conduit segments by intervening closable gates, said conduit segments being characterized as occupied whenever at least one of the vehicles is transiting therethrough, and being characterized as unoccupied when none of the vehicles is transiting therethrough;
   a plurality of segment evacuation systems:
      each of the segment evacuation systems being associated with a corresponding one of the conduit segments;
      each of the segment evacuation systems being configured, when activated, to establish and maintain an internal pressure of its corresponding conduit segment that is at or below a maximum operating pressure; and
      each of the segment evacuation systems being configured, when deactivated, to disengage from its corresponding conduit segment and to minimize its consumption of energy; and
   a controller that is able to activate and deactivate the segment evacuation systems, and to cause the gates to open and close,
   the controller being configured to conserve energy while the travel conduit is in operation by deactivating at least one of the segment evacuation systems when its corresponding conduit segment is unoccupied, while ensuring that each of the conduit segments, whenever it is occupied, is evacuated to an internal pressure that is at or below the maximum operating pressure.

2. The evacuated transportation system of claim 1, further comprising sensors cooperative with the travel conduit, the sensors being configured to provide information to the controller relating to at least one of locations, speeds, and directions of travel of the vehicles within the travel conduit.

3. The evacuated transportation system of claim 1, wherein each of the segment evacuation systems comprises a segment evacuation valve that is configured to enable fluid communication between the segment evacuation system and its associated conduit segment when the segment evacuation system is activated, and to isolate the segment evacuation system from fluid communication with its associated conduit segment when the segment evacuation system is deactivated.

4. The evacuated transportation system of claim 1, wherein at least one of the segment evacuation systems is configured to participate in reestablishing a vacuum within its corresponding conduit segment after a pressure within the conduit segment has been raised to atmospheric pressure.

5. The evacuated transportation system of claim 1, wherein the controller is configured to activate all of the segment evacuation systems having associated conduit segments for which there is an approaching vehicle in an adjacent conduit segment.

6. The evacuated transportation system of claim 1, wherein the controller is configured to activate all of the segment evacuation systems having associated conduit segments for which an approaching vehicle is separated from the conduit segment by only one intervening conduit segment.

7. The evacuated transportation system of claim 1, further comprising a boom-tank system comprising a plurality of boom-tank passages in fluid communication with the conduit segments and interconnected with each other via a plurality of boom-tank valves, the controller being able to cause the boom tank valves to enable and disable fluid communication between selected pairs of conduit segments.

8. The evacuated transportation system of claim 7, wherein the controller is configured to reduce an internal pressure within a first of the conduit segments by causing the boom-tank valves to establish fluid communication between the first of the conduit segments and a second of the conduit segments if an internal pressure of the second conduit segment is lower than the internal pressure of the first conduit segment.

9. The evacuated transportation system of claim 7, wherein the controller is able to cause the boom-tank valves to establish simultaneous fluid communication between at least three of the conduit segments.

10. A method of reducing energy consumption of an evacuated transportation system comprising a travel conduit configured, when in operation, to enable transit therethrough of vehicles, the travel conduit being divided into a sequential plurality of conduit segments by intervening closable gates; the transportation system further comprising a plurality of segment evacuation systems, each of the segment evacuation systems being associated with a corresponding one of the conduit segments, the method comprising periodically or continuously performing the following steps:
for each of the vehicles that is within the travel conduit, determining the vehicle's location, speed, and direction of travel;
for each of the conduit segments that is occupied, in that it contains at least one of the vehicles, causing the associated segment evacuation system to maintain an internal pressure of the conduit segment at or below a specified maximum operating pressure;
for each of the conduit segments that is unoccupied, in that it does not contain one of the vehicles determining a time duration $t_u$ during which the conduit segment will remain unoccupied and a length of time $t_e$ required for the associated segment evacuation system to reduce the internal pressure of the conduit segment until said internal pressure is at or below the specified maximum operating pressure, and
if $t_u$ is greater than $t_e$, deactivating the associated segment evacuation system; or
if $t_u$ is less than or equal to $t_e$, activating the associated segment evacuation system.

11. The method of claim 10, further comprising closing all of the gates that are between a conduit segment having an internal pressure at or below the maximum operating pressure and a conduit segments having an internal pressure above the maximum operating pressure.

12. The method of claim 10, wherein deactivating a segment evacuation system includes isolating the segment evacuation system from fluid communication with its associated conduit segment by closing an evacuation valve of the segment evacuation system, and wherein activating the segment evacuation system includes establishing fluid communication between the segment evacuation system and its associated conduit segment by opening the evacuation valve of the segment evacuation system.

13. The method of claim 10, wherein the method further includes activating one of the segment evacuation systems while reestablishing a vacuum within its corresponding conduit segment after an internal pressure of the conduit segment has been raised to atmospheric pressure.

14. The method of claim 10, wherein:
the evacuated transportation system further comprises a boom-tank system that includes a plurality of boom-tank passages in fluid communication with the conduit segments and interconnected with each other via a plurality of boom-tank valves, and the method further comprises:
identifying a first of the conduit segments having an internal pressure p1 that is above the maximum operating pressure;
identifying a second of the conduit segments having an internal pressure less than p1; and
causing the boom-tank system to establish fluid communication between the first and second conduit segments.

15. The method of claim 14, wherein the method further comprises:
identifying a plurality of second conduit segments having internal pressures that are less than p1 and having associated segment evacuation systems that are deactivated; and
causing the boom-tank system to establish fluid communication between the first conduit segment and the plurality of second conduit segments.

* * * * *